Nov. 10, 1925.  
P. EASTERDAY  
1,560,931
CONCRETE PIPE JOINT, MEANS AND METHOD OF FORMING THE SAME
Filed April 17, 1923
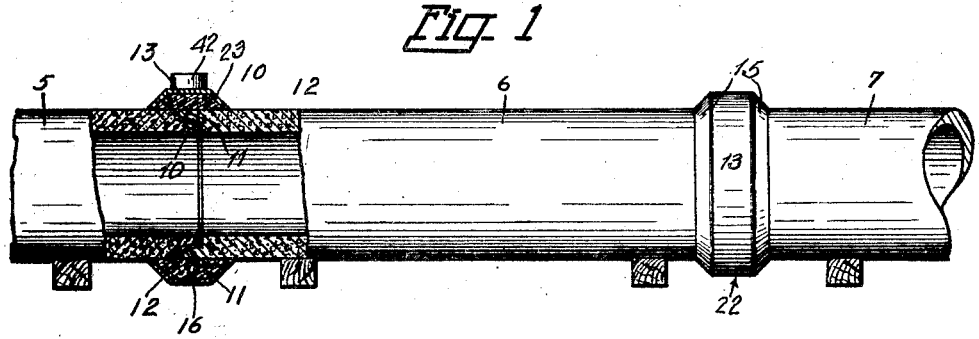
Fig. 1
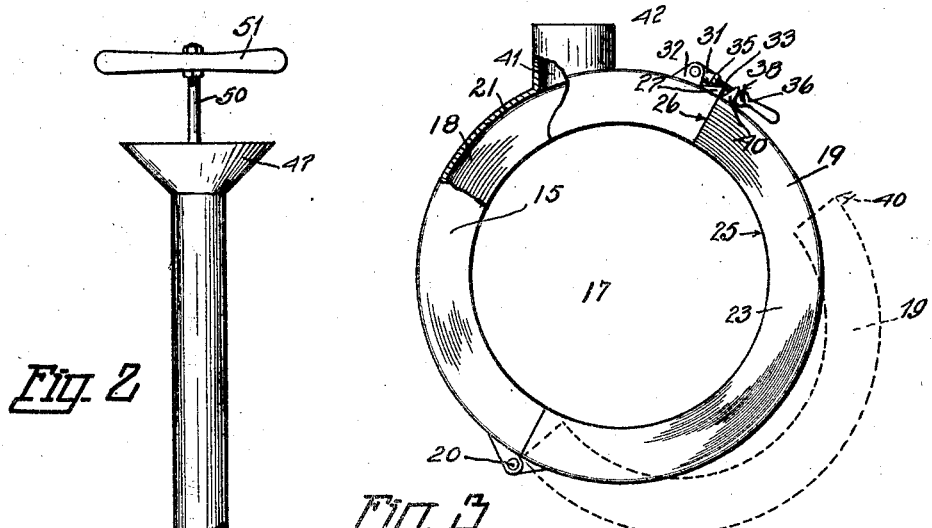
Fig. 2
Fig. 3
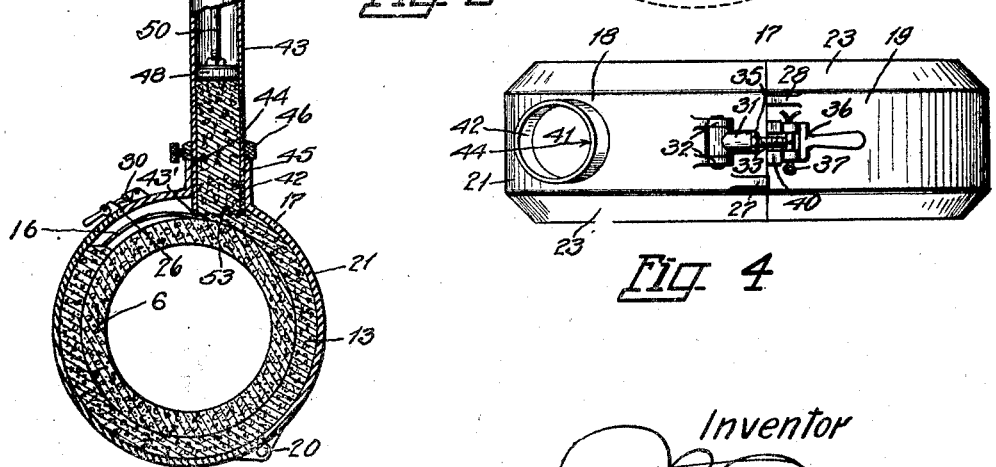
Fig. 4
Inventor  
Phil Easterday Patented Nov. 10, 1925.

1,560,931

UNITED STATES PATENT OFFICE.

PHIL EASTERDAY, OF PORTLAND, OREGON, ASSIGNOR TO CONCRETE PIPE COMPANY, OF PORTLAND, OREGON, A CORPORATION OF OREGON.

CONCRETE PIPE JOINT, MEANS AND METHOD OF FORMING THE SAME.

Application filed April 17, 1923. Serial No. 632,764.

*To all whom it may concern:*

Be it known that I, PHIL EASTERDAY, a citizen of the United States, residing at Portland, in the county of Multnomah and State of Oregon, have invented a new and useful Improvement in Concrete Pipe Joints, Means and Methods of Forming the Same, described in the following specification.

This invention relates to improvements in concrete pipe, and particularly to forming the same with a reinforcing joint, together with methods and appliances of making the same.

An object of the invention is to provide a reinforcing collar of plastic cement composition and of novel construction that may be applied about a pipe or pipe-joint as the pipe is assembled or thereafter whereby the pipe joint is made capable of sustaining pressures at least equal to the strength of the main pipe-body.

A further object of the invention is to provide a novel method of assembling a line of concrete pipe and reinforcing them at their joints whereby a pipe-line capable of withstanding relatively heavy hydraulic pressures may be assembled with pipe-units of lighter construction than hitherto.

A still further object of the invention is the provision of a mold adapted to be clamped about the adjoining ends of pipe-sections during the process of forming a pipe-line whereby said sections are held rigidly in coaxial alignment and against longitudinal displacement while the joint therebetween is being made.

A still further object of the invention is the provision of a detachable mold for forming a reinforcing collar about a pipe whereby plastic cement material for said collar may be introduced under considerable pressure to increase the density thereof and to maintain the plastic collar in close operative contact throughout its entire inner circumferential surface with the walls of the pipe during the setting period.

A still further object of the invention is the provision of simple, novel and convenient appliances and means to apply a reinforcing collar of plastic composition about a pipe either at a joint or about any portion thereof demanding additional strength.

The invention consists in the novel construction, arrangement and adaptation of a concrete pipe, and particularly of a joint or reinforcement therefor, together with the novel method of forming the same, as will be fully described in the following specification, illustrated in the accompanying drawings, and finally set forth in the appended claims.

In the accompanying drawings:

Figure 1 is a view partly in side elevation and partly in vertical section of a concrete pipe line and reinforcing joint therefor of my invention.

Fig. 2 is a transverse sectional view of a pipe and mold therefor, the pump-casing employed therewith being shown in side elevation, partly broken away and illustrating the movement of the material within the mold.

Fig. 3 is a view in side elevation of my improved mold, partly broken away, and showing a half-section thereof open in broken lines.

Fig. 4 is a top plan view of said mold.

Referring to said views, the reference numerals 5, 6 and 7 indicate pipe-sections arranged in end-to-end relation to form a continuous conduit. Said pipe-sections for the purpose of this invention may be composed of any suitable material with which a plastic cement composition may make an operative bond. In the illustrated example I have shown pipe-sections formed of concrete material which may be provided with internal metal reinforcement devices, not shown. Said sections are formed with interfitting ends of a commonly used type consisting in inner and outer annular flanges 10 and 11, respectively, making the inner and outer walls of the pipe flush, although other forms of end connections may be used with the invention. A mortar 12 of cementitious composition is placed between the abutting ends of the pipe which with concrete or vitreous pipe results in a substantially monolithic construction.

A joint of the character described is commonly employed for sewer-pipe and conduits for low-pressure water distribution. For sustaining hydrodynamic forces of considerable amount it is found that joints of the usual type are not reliable, due largely to the break in the metal reinforcement at the joint.

To overcome this difficulty and to secure a joint at least as efficient in strength as any section of the pipe I apply a band or collar 13 of plastic cement composition symmetrically about the joint when the pipe-line is in situ and preferably as the pipe-sections are added. Said collar is of any suitable configuration and area in cross-section to meet the engineering requirements and the exterior surface conformation of the pipe. Sufficient width of bearing on the pipe being given to well cover the width of the pipe-joint and to provide a sufficient bonding surface on each side thereof. To this end I preferably form said collar with opposite beveled or chamfered edges 15 and annular reinforcement of metal webbing or the like 16 is placed within the collar during its formation.

The apparatus employed to form said collar consists in a two-part annular mold, indicated generally by the numeral 17, formed of openable half-sections 18 and 19 hingedly connected at 20 and each consisting in an outer mid-wall 21 molding the outer perimeter 22 of the collar, and oppositely inclined side walls 23 adapted to mold said beveled edges 15. The inner circular edges 25 of the mold are formed to make an efficiently close connection with the exterior surface of the pipe.

The meeting edges of said mold-sections are disposed radially thereof and form mutually abutting joints, the openable joint 26 having studs 27 and 28 on opposite sides of the transverse axis of the mold on said sections 18 and 19, respectively, with their outer edges in the radial plane of the joint 26 whereby any telescoping effect at said abutting joint in case of accidental distortion is avoided.

A locking device or shackle to detachably connect said sections together, indicated generally by numeral 30, is composed in detail of a barrel-member 31 pivotally mounted in ears 32 integral with said mold-section 18 and is provided with a screw-threaded socket in which a screw-threaded bolt 33 is engaged and bears a lock-nut 35. A forked lever 36 is pivotally secured to the head of said bolt by a removable pin 37 and is formed with flat faces 38 on its forked ends engageable with spaced lugs 40 cast adjacent the edge of the joint 26 on the section 19. The described construction will be well understood and admits of an adjustable degree of tension being exerted upon the sections to bring them closely together through the adjusted length given the bolt 33.

An opening 41 is formed in said mold-section 18 having an outwardly directed tubular neck therefor 42 disposed with its axis when extended inwardly offset from the central longitudinal axis of the pipe or mold and with the innermost portion 44 of its perimeter substantially on a line radial of the pipe or mold. A detachable pump-casing or cylinder 43 is provided to introduce the cement material within said mold under pressure of which the lower end 45 is insertable in said neck 42 and is provided with an exteriorly disposed ring 46 adjustably secured at predetermined points about said cylinder to form a shoulder to rest upon the upper extremity of said neck to support the weight of the cylinder.

The lower extremity of said cylinder, indicated by 43', extends within said neck and mold channel to engage or nearly so, as determined by said ring 46, with the exterior wall of the pipe, and owing to the offset relation of the neck to the axis of said pipe one portion of said extremity 43' will nearly contact with the pipe practically closing the annular mold-channel upon that side to the passage of cement material while a relatively large opening is afforded directed into the opposite side of said channel, that is to say, toward the side adjacent to which the axis of the neck is offset.

The interior of said cylinder is of uniform cylindrical configuration throughout its length and is provided with a flaring feed-hopper 47 at its top. 48 indicates a pump-plunger operatively disposed in said cylinder and provided with an actuating rod 50 and handle 51. It may be said that the supporting ring 46 may be dispensed with and the edge 43' of the cylinder allowed to rest upon the pipe if such position will not unduly distort the reinforcing material 16.

The method of forming the pipe-line with my improved collar and the manner of using the said appliances may be described as follows: The ends of two pipe-sections are brought together to cause their respective flanges 10 and 11 to interfit and plastic cement mortar 12 is applied completely filling the space therebetween.

I then affix the mold 17 about the pipe-joint in the position heretofore described and clamp the half-sections thereof together to form a continuous mold-channel about the pipe-ends and overlaying symmetrically the mortared or grouted joint. The metal reinforcement material 16 is placed in said channel and the ends of the joint 26 brought together and clamped as described whereby the interior circular edge 25 of the mold of the proper size will coincide with the exterior surface of the pipe.

The cylinder 43 is then inserted in the neck 42 in the manner described and the cylinder is filled through the hopper 47 with sufficient plastic cement material to somewhat more than the capacity of the mold 17. The plunger 48 is then inserted in the cylinder above the cement and on being forced downwardly thereon forces the plastic cement through the neck 42 and about the annular channel within the mold. Owing to the directional position of the neck 42 relative to said channel, that is to say, the axis of said tubular neck being offset from the longitudinal axis of the pipe and also from said channel which is concentric therewith, and owing to the interposition of the cylinder end 43' having one side thereof adjacent the pipe wall and leaving an opening directed into the channel upon the side adjacent to which the axis of the neck 42 is offset a stream of cement material issuing from said cylinder end into said channel as forced in by said pump will be directed positively to follow a circular course about the channel and will force the air within the mold through the cracks and spaces existing between the mold parts and between the mold and the pipe, as illustrated in Fig. 2, thus affording in practice and effect a wiped joint completely filling the mold with a dense mass free from air or voids and in close adherent contact with the pipe.

The advance end of said column of cement material will then be united at the top of the channel adjacent the neck 42 with the entering material, the cylinder 43 being partially withdrawn to admit the channel being completely filled. During the course of said cement column about said channel it will unite with the plastic material 12 constituting the filling between the pipe-ends making an integral union therewith and to almost an equal extent makes a bond with the pipe-walls so that a substantially monolithic construction is afforded having particular strength about the pipe-joints.

The cylinder 43 may then be entirely removed and the neck 42 freed of superfluous cement material, whereupon the plastic collar thus formed about the pipe is allowed to set, usually from 18 to 24 hours. In such period of setting the mold serves a valuable and novel purpose in holding the pipe-ends in alignment and in their operative spaced relation during said setting period and also serves as a protective covering for the setting material to guard against the deleterious effect of adverse atmospheric conditions, such as the direct action of the sun, wind or frost, which may otherwise cause an unequal set about the collar and an imperfect result.

One of the chief advantages of my invention resides in the increased density of the material in the pipe-collar formed thereby and the closeness with which said collar adheres to the pipe-walls about the entire circumference thereof, and particularly about the lower portion of its circumference where the effect of gravity and the pressure with which the plastic material is introduced in the mold causes the material to crowd tightly against the pipe instead of tending to pull away therefrom as would otherwise be the case.

It is obvious that a reinforcing band or collar may be formed about a pipe at any place in its length, so that when cracks or faults appear in a pipe a collar may be cast thereabout at selected points to provide against bursting or extension of developed cracks.

In practice and in experimental tests on pipe to the bursting point it has been found that pipe of standard make using the usual and approved methods of reinforcement when equipped with joints reinforced with collars made in accordance with my invention will break at any point between their joints rather than at their joints while without their use the reverse of such conditions has usually been the case.

Having described my invention, what I claim, is:—

1. The process of forming a concrete pipe line, consisting in laying pipe-sections in end-to-end relation, filling the joint between said sections with cement mortar of relatively thick consistency, and molding an imposed adherent collar of relatively moist plastic cement material over said joint to make monolithic union with said mortar.

2. The process of forming a concrete pipe line, consisting in laying concrete pipe sections in end-to-end relation, filling the joint between said sections with a relatively dry cementitious mortar to form a bond between said pipe ends and to provide a dam to prevent the flow of the collar material through said joint, placing a collar-mold about said joint, and forcing a stream of relatively wetter cement material into said mold to make a monolithic union with said mortar.

3. The process of forming a concrete pipe line, consisting in laying pipe sections in end-to-end relation, filling the joint between said sections with relatively dry cement material, placing an annular mold about said joint, and forcing a more plastic cement material under pressure through said mold to form a continuous collar over said joint, adherent to the exterior walls of said pipe and integrally united to said filling material.

4. The process of forming a collar about a pipe, consisting in securing a mold containing an annular channel about a pipe, and forcing a stream of cement material obliquely with respect to the pipe radius into said channel to completely fill the same.

5. The process of forming a reinforcing collar about a pipe, consisting in securing a mold containing an annular channel about a pipe, and forcing a stream of cement material into said channel and causing the same to flow thereabout in one circular direction to completely fill said channel.

6. The process of forming a concrete pipe line, consisting in laying the pipe-sections in end-to-end relation, filling the joint between said sections with relatively dry cement material, securing a mold containing an annular channel about the pipe-ends to cover said joint and to make an operative contact with the exterior walls of the pipe, and introducing plastic cement material of a thinner consistency into said mold-channel under pressure to form a continuous adherent collar over said joint.

7. The process of forming a concrete pipe line, consisting in laying pipe-sections in end-to-end relation, filling the joint between the sections with plastic cement material, securing a mold containing an annular channel about said pipe to cover said joint, and filling said mold-channel with a stream of plastic cement material flowing in one direction only.

8. The process of forming a concrete pipe, consisting in laying pipe-sections in end-to-end relation, filling the joint between said sections with plastic cement material, securing a mold containing an annular channel about said pipe to cover said joint, introducing a stream of plastic cement material into said channel under pressure, and causing said stream to flow about said channel in a unitary circular direction to completely fill the channel.

9. The process of forming a concrete pipe line, consisting in laying pipe-sections in end-to-end relation, filling the joint between said sections with plastic cement material, securing a mold including an annular channel about said pipe over said joint, interposing a barrier in said channel, introducing cement material under pressure into said channel upon one side of said barrier and causing the same to flow about said channel, and removing said barrier when said channel is filled to allow the stream of cement to unite.

10. In apparatus of the class described, a sectional mold adapted to be detachably connected to a pipe, said mold having side walls engageable with said pipe to provide an annular mold-channel, and means for introducing plastic cement material within said mold in a stream from one side and about said channel.

11. In apparatus of the class described, a sectional mold adapted to be detachably connected to a pipe, said mold having side walls engageable with said pipe to provide an annular mold-channel, and means for introducing plastic cement material under pressure directed in a progressively moving stream from one side and about said channel.

12. In apparatus of the class described, a sectional mold adapted to be detachably secured to a pipe, said mold having side walls engageable with said pipe to provide an annular mold-channel, means for introducing plastic material within said mold consisting in an opening provided with an exterior tubular neck having its axis inclined to the radius of the pipe, and a pump arranged to be communicatively connected to said neck for injecting cement material through said opening.

13. In apparatus of the class described, a sectional mold adapted to be detachably secured to a pipe, said mold having side walls engageable with said pipe to provide an annular mold-channel, means for introducing plastic material within said mold consisting in an opening provided with an exterior tubular neck having its axis inclined to the radius of the pipe, a pump cylinder arranged to be inserted within said neck to approximately engage on one side with the pipe surface leaving an exit opening on its other side, and a plunger in said cylinder.

14. In apparatus of the class described, a two-part mold having a hinge connection upon one side and a clamp to detachably connect the mold parts upon the opposite side, said mold-parts having an interior opening adapted to closely engage the exterior walls of a pipe, and formed with an annular channel-mold thereabout, and an opening into said channel for the introduction of a plastic material having its axis offset from the radius of the mold.

15. In apparatus of the class described, a two-part mold having a hinged connection upon one side and a clamp to detachably connect the mold-parts upon the opposite side, said mold-parts having an interior circular edge adapted to closely engage the exterior wall of a pipe, said mold being formed with an annular channel having an opening in its exterior wall for the introduction of plastic material, said opening having its axis offset from the radius of the mold and means to force a column of plastic material about said channel.

16. In apparatus of the class described, a two-part mold having an interior opening adapted to closely engage the exterior walls of a pipe, and formed with an annular channel thereabout, an opening into said channel for the introduction of plastic material, a filling cylinder adapted to have its lower end inserted in said mold-opening, and adjustable means to vary the length of the cylinder-end inserted within said opening.

17. In apparatus of the class described, a two-part mold having a hinge connection upon one side and a clamp to detachably connect the mold parts upon the opposite side, said mold-parts having an interior opening adapted to closely engage the exterior walls of a pipe, and formed with an annular channel-mold thereabout, and an opening into said channel for the introduction of a plastic material, of a pump cylinder arranged to be inserted within said opening and disposed to approximately engage on one side with the pipe surface affording an exit opening for the plastic material on its opposite side, and a plunger in said cylinder.

18. In apparatus of the class described, in combination with a circular pipe, of a sectional mold detachably connected to the pipe affording an annular mold-channel thereabout, a tubular neck affording an opening to said channel disposed with an extension of its axial line offset from the center of said pipe, and means for introducing plastic cement material within said channel under pressure.

19. In apparatus of the class described, in combination with a circular pipe, of a sectional mold detachably connected to said pipe affording an annular mold-channel thereabout, a tubular neck affording an opening to said channel, and a pump operatively mounted in said opening disposed to direct a stream of plastic material under pressure through said channel in one direction only.

20. In apparatus of the class described, in combination with a circular pipe, of a mold detachably connected to said pipe affording an annular channel thereabout, said mold having an opening in its wall, and a pump disposed to protrude within said opening and obstruct said channel upon one side thereof leaving an opening on its other side whereby plastic material forced into said channel will flow thereabout in one direction.

21. In apparatus of the class described, in combination with a circular pipe, of mold detachably connecting to the pipe and provided with an annular mold-channel thereabout, and means to introduce and force a charge of plastic material under pressure through said channel and progressively therethrough from one side to unite with the entering stream adjacent the point of entrance.

PHIL EASTERDAY.